United States Patent [19]

Williams

[11] 4,406,603
[45] Sep. 27, 1983

[54] PASTA EXTRUDER APPARATUS FOR ATTACHMENT TO A FOOD PROCESSOR OR SIMILAR APPLIANCE

[75] Inventor: James E. Williams, Stamford, Conn.

[73] Assignee: Cuisinarts Research & Development, Inc., Greenwich, Conn.

[21] Appl. No.: 368,979

[22] Filed: Apr. 16, 1982

[51] Int. Cl.³ .......................... B29F 3/01; A21C 3/04
[52] U.S. Cl. ................................. 425/191; 425/376 R
[58] Field of Search .................... 425/190, 191, 376 R

[56] References Cited

U.S. PATENT DOCUMENTS

| 3,001,485 | 9/1961 | Czik | 425/190 |
| 4,269,582 | 5/1981 | Mella | 425/190 |
| 4,367,064 | 1/1983 | Prandelli et al. | 425/376 R |

FOREIGN PATENT DOCUMENTS

| 50409 | 4/1982 | European Pat. Off. | 425/376 R |
| 2421720 | 4/1974 | Fed. Rep. of Germany | 425/376 R |

Primary Examiner—Willard E. Hoag
Attorney, Agent, or Firm—Parmelee, Bollinger & Bramblett

[57] ABSTRACT

Pasta extruder attachment for a food processor or the like having a base containing a motor and rotary tool drive, and the attachment including a housing for receiving a pasta mixture to be extruded. The housing carries means for cooperatively engaging an actuator means in the base. A barrel surrounding a feedscrew is positioned in the housing with an opening in the barrel aligned with an opening in the housing for receiving the pasta mixture. An extrusion die bearing a plurality of orifices is mounted on the discharge end of the barrel.

23 Claims, 11 Drawing Figures

PASTA EXTRUDER APPARATUS FOR ATTACHMENT TO A FOOD PROCESSOR OR SIMILAR APPLIANCE

BACKGROUND OF THE INVENTION

This invention relates to pasta extruder apparatus which is driven as an attachment to an existing electrical appliance with a motor drive, such as a food processor base, for shaping articles of food from freshly mixed dough or alimentary granules known as pasta to form strand-like food items such as spaghetti, vermicelli, noodles, ribbons, strings, strands, etc.

The illustrative embodiment of the present invention is employed as an attachment to food processors of the type having a working bowl with motor-driven tool drive means extending into the bowl with which various selected rotary food processing tools can be engaged to be driven for performing various food processing operations in accordance with the desires of the user. A removable cover is secured over the top of the bowl during use. The cover includes a feed tube having a passageway which opens downwardly through the cover into the bowl, and the food items to be processed are placed in the feed tube and then pushed down into the bowl by means of a removable food pusher which is adapted to slide down in the manner of a plunger in the feed tube. The food items are sliced, grated, or otherwise processed by the rotary tool in the bowl. The bowl carries on its periphery a push rod which forms a part of a safety interlock system for actuating the motor drive for driving the tool drive means only when the bowl and the cover are properly positioned on the food processor.

Additional information with respect to such food processors may be obtained by reference to U.S. Pat. Nos. 3,892,365; 3,985,304; 4,198,887; 4,200,244; 4,216,917; 4,213,570; 4,226,373; 4,227,655; and 4,277,995.

A recent addition to the field of kitchen appliances is the pasta machine which extrudes spaghetti, noodles, etc. from a fresh pasta mixture. The addition of another complete appliance is costly as well as requiring additional storage space on counter tops or in already overcrowded kitchen storage facilities.

SUMMARY OF THE INVENTION

Accordingly, it is an object of this invention to provide pasta extruder apparatus as an attachment which can be mounted on the base of a food processor and which employs the motor and motor drive means of the food processor.

A further object of this invention is to provide a pasta extrusion attachment for a food processor which is compact, efficient, and attractive.

Another object of this invention is to provide a pasta extruder attachment for a food processor which enjoys all of the safety interlock features which are presently utilized in food processors to prevent damage or injury to the machine or user.

It is among the advantages of this invention that it provides a pasta extruder attachment which may easily and safety be attached to and disengaged from the motor-driven tool drive means of a food processor, and is convenient and easy to mount in operating position and to use.

In carrying out this invention in one illustrative embodiment thereof, pasta extruder apparatus is provided for attachment to a food processor of the type having a base with a motor drive housed therein and motor-driven rotary tool drive means extending therefrom as well as having first actuator means adapted to be actuated when a working bowl is mounted thereon which employs the motor drive in the base. The pasta extruder attachment has a housing carrying second actuator means which is positioned in alignment with the first actuator means in the base when the housing is operatively positioned on the base, for rendering the motor drive operable when the pasta extruder apparatus is properly and fully mounted on the base. A removable tray is mounted on the housing for feeding a pasta mixture to the extruder barrel, and the tray carries a cam actuator for actuating the aligned second and first actuator means when the tray and the housing are properly mounted on the base. The housing contains the extruder barrel carrying a feedscrew and having an opening therein in communication with the tray for receiving the pasta mixture from the tray. An extrusion die having a plurality of extrusion orifices is mounted on the discharge end of the barrel, while the feedscrew is coupled by speed-reducing gear drive means to the motor-driven drive means in the base. Accordingly, when the housing and tray carrying the pasta mixture are properly positioned on the base of the food processor, the motor drive of the processor can be turned on by manual controls for rotating the feedscrew and driving the pasta mixture fed from the tray into the apparatus out through the extrusion orifices for producing fresh food products. The housing also carries a storage compartment for an assortment of interchangeable dies. An indicator is provided on the housing for properly positioning the housing and tray on the tool drive means. The tray also allows the user to view the feed screw and barrel in the housing but prevents the insertion of the hand therein.

BRIEF DESCRIPTION OF THE DRAWINGS

The invention, together with further objects, features, advantages and aspects thereof will be more fully understood from a consideration of the following description taken in conjunction with the accompanying drawings in which like elements are designated with the same reference numerals throughout the various views.

DESCRIPTION OF THE PREFERRED EMBODIMENTS

As used in this application, "pasta" is defined as any of those food products which may be made by extrusion, regardless of the shape, configuration, or consistency or ingredients involved. For example, certain types of pasta may be prepared from semolina, farina, or wheat flour or a mixture of these with water or milk or with or without egg yolks or other ingredients. Noodles, for example, which may be extruded, have a greater concentration of egg yolks, while green spaghetti or noodles may include spinach. At times the specification will refer to pasta mixture, which includes dough or alimentary paste and which may have a variety of consistencies including flaky, powdery, granular, doughy, pasty, etc. The best results are obtained in the apparatus described by using pasta mixtures which preferably have consistencies of granular, powdery or small-flake characteristics when placed in the tray prior to entry into the extruder. Doughy or pasty consistencies of the pasta mixture can be used, but are not among the preferred consistencies. In other words, the preferred pasta mixtures for use herein are semi-dry or damp mixtures as distinguished from wet sticky or gooey mixtures, because extrusions of the wet, sticky or gooey consistencies tend to cling or clump together after extrusion.

The size and the shape of the extruded food items will depend on the size and the shape of the orifices in the extrusion die through which the pasta mixture, dough or alimentary paste is forced by pressurization produced in a pressure chamber adjacent to the extrusion die. These elongated strand-like shapes may include flat ribbon shapes characteristic of noodles, round solid shapes characteristic of spaghetti, combination of round and flat shapes, such as linguini, very thin round shapes characteristic of vermicelli, hollow elongated shapes, characteristic of macaroni, ribbon shapes, strings, strands, etc.

Figure 1:
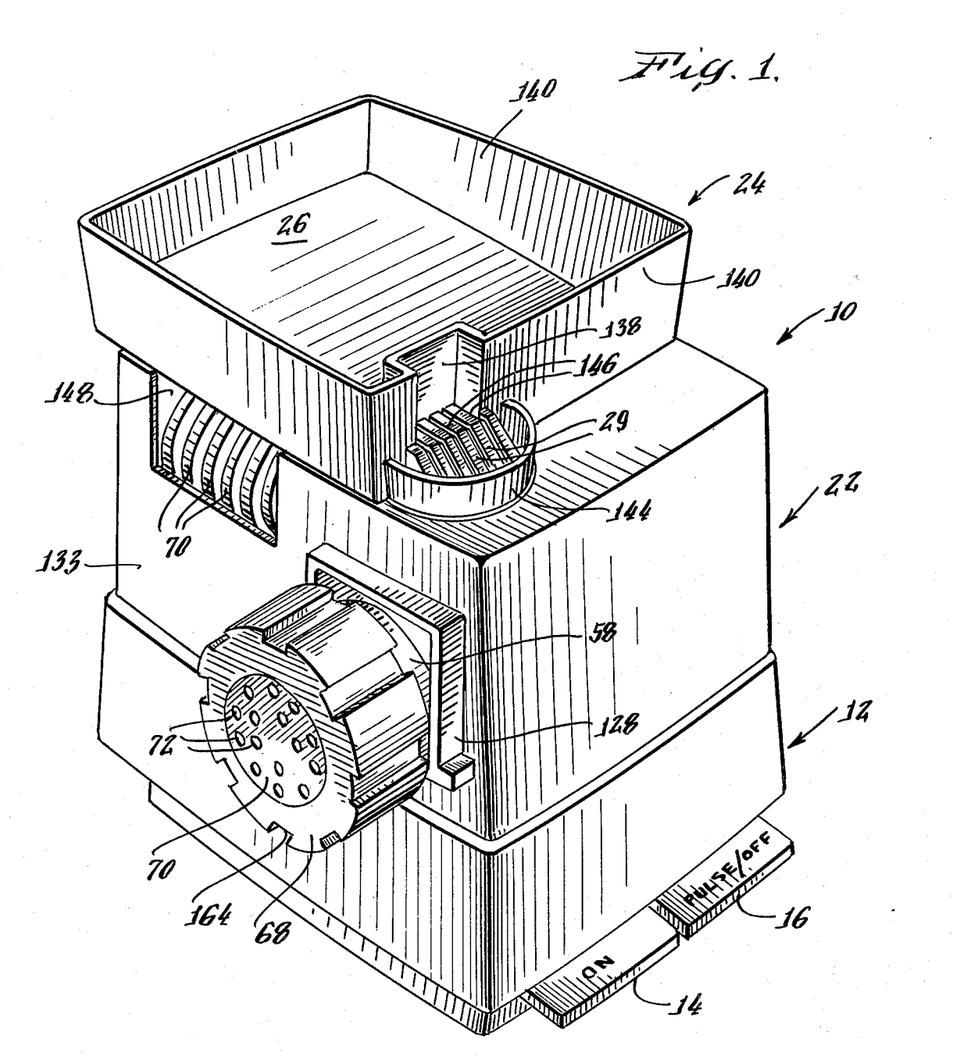
FIG. 1 is a perspective view illustrating the pasta extruder apparatus of the present invention mounted as an attachment in operative position on the base of a food processor.

Referring now to FIG. 1, pasta extruder apparatus for mounting as an attachment on the base of a food processor is referred to generally with the reference number 10. This apparatus 10 is shown operatively positioned on the base 12 of a food processor of the type described in the patents referred to in the introduction, and as illustrated in FIG. 1, includes an "ON" bar control lever 14 and a PULSE/OFF bar control lever 16 for manually controlling the operation of the food processor motor drive (not shown) in the base 12.

This pasta extruder apparatus includes two main components as will be described in full later. One main component is the housing 22 which can be quickly and easily mounted upon or removed from the food processor base 12. The other main component is the tray 24 for holding the pasta mixture, which, in turn, is quickly and easily mounted upon the housing 22. After both of these components 22 and 24 are mounted in position, the control levers 14 and 16 are used to run the assembled machine.

Figure 3:
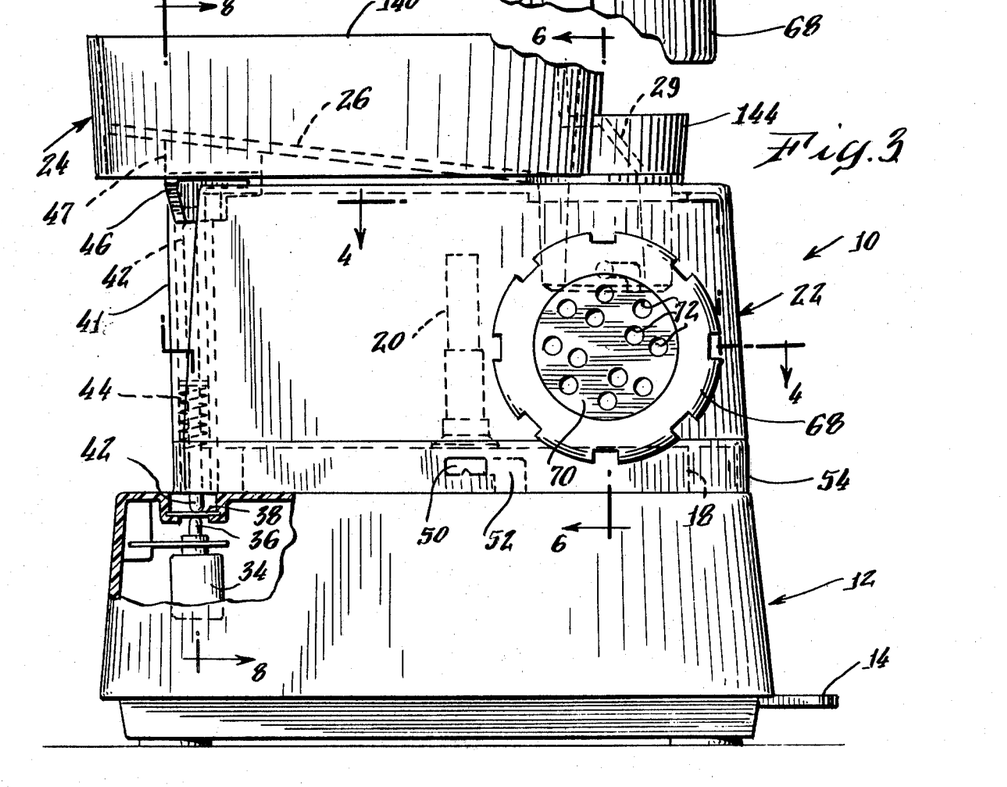
FIG. 3 is an elevational view of the apparatus of FIG. 1, with a portion broken away. This view is looking at the side of the machine from which the extruded foodstuff issues.

As will be seen in FIG. 3, the base 12 has a pedestal 18, and extending vertically therefrom is rotary tool drive means 20 in the form of a shaft which is rotated by the motor drive in the food processor base 12. The pasta extruder apparatus 10 is adapted to be positioned on the base to be driven by the tool drive means 20.

Figures 9, 10, 11:
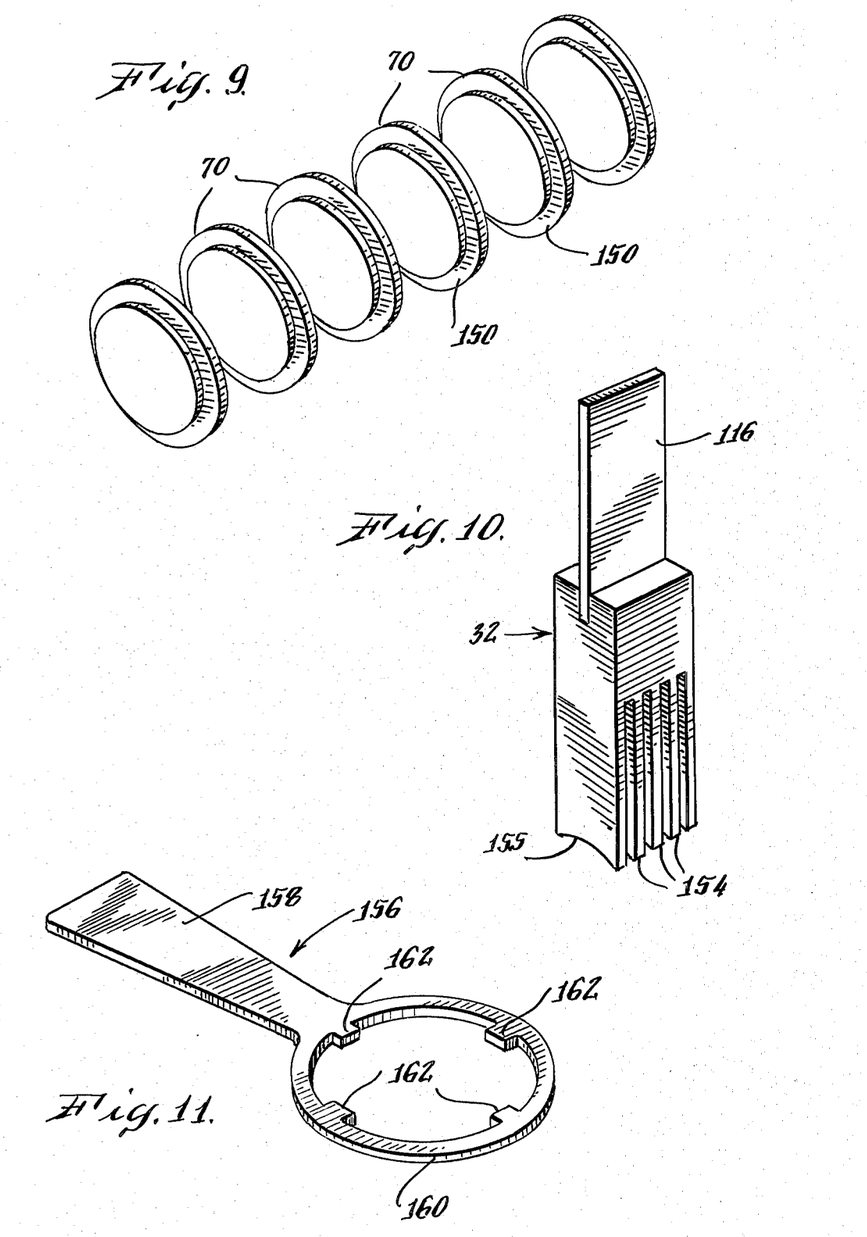
FIG. 9 is a perspective view illustrating a plurality of interchangeable extrusion dies which may be conveniently stored in the pasta extruder attachment as illustrated in FIG. 1.
FIG. 10 is a perspective view of a plunger which may be used with the pasta extruder apparatus illustrated in FIG. 1.
FIG. 11 is a perspective view of a wrench which may be utilized with the pasta extruder apparatus of FIG. 1 for changing the extruder dies and/or cleaning the extruder barrel and feedscrew.

As will best be seen in FIGS. 1 and 3, the pasta extruder apparatus 10 includes the housing 22 seated down around the rotary tool drive means 20 and mounted on the pedestal 18 of the base 12. The housing 22 in turn carries the removable tray 24 having an inclined bottom 26 which terminates on the lower end at one corner of the tray in a cylindrical feedtube 28. There is a barrier grill 29 extending over the top of the feedtube for providing visibility into the apparatus 10 and for permitting a plunger 32 as shown in FIG. 10 to be inserted down into the feedtube for pushing down the pasta mixture when necessary or when desired.

Figures 4, 5:
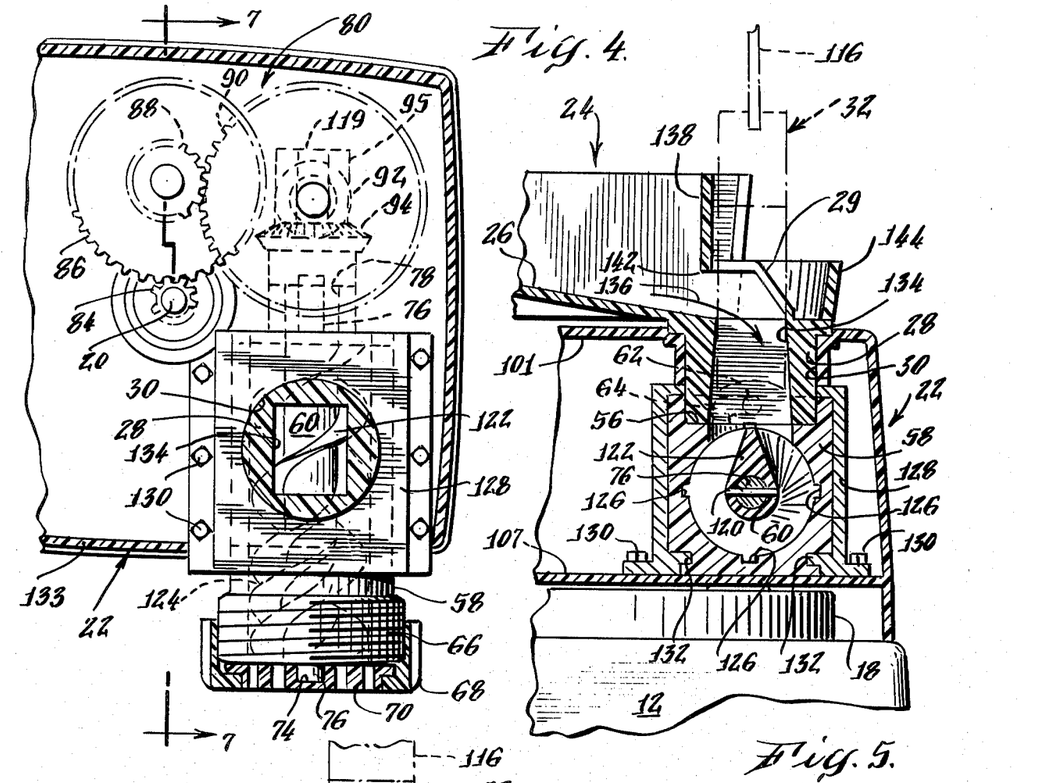
FIG. 4 is a cross-sectional plan view taken along line 4—4 of FIG. 3 looking downwardly.
FIG. 5 is a partial cross-sectional elevational view taken along line 5—5 of FIG. 2.

The feedtube 28 is circular cylindrical in cross section and fits down into a socket 30 in the housing 22 as is best shown in FIG. 5. The purpose of the tray 24 with its inclined bottom 26 terminating in the feedtube 28, is to supply or feed the pasta mixture, which has previously been loaded into the tray, into the operating mechanism of the pasta extruder apparatus 10 as will be explained hereinafter. The protective barrier grill 29 covering the feedtube opening 28 permits the user to see down inside of the feedtube into the extruder barrel but prevents the user from inadvertently inserting fingers into the feedtube.

Figures 7, 8:
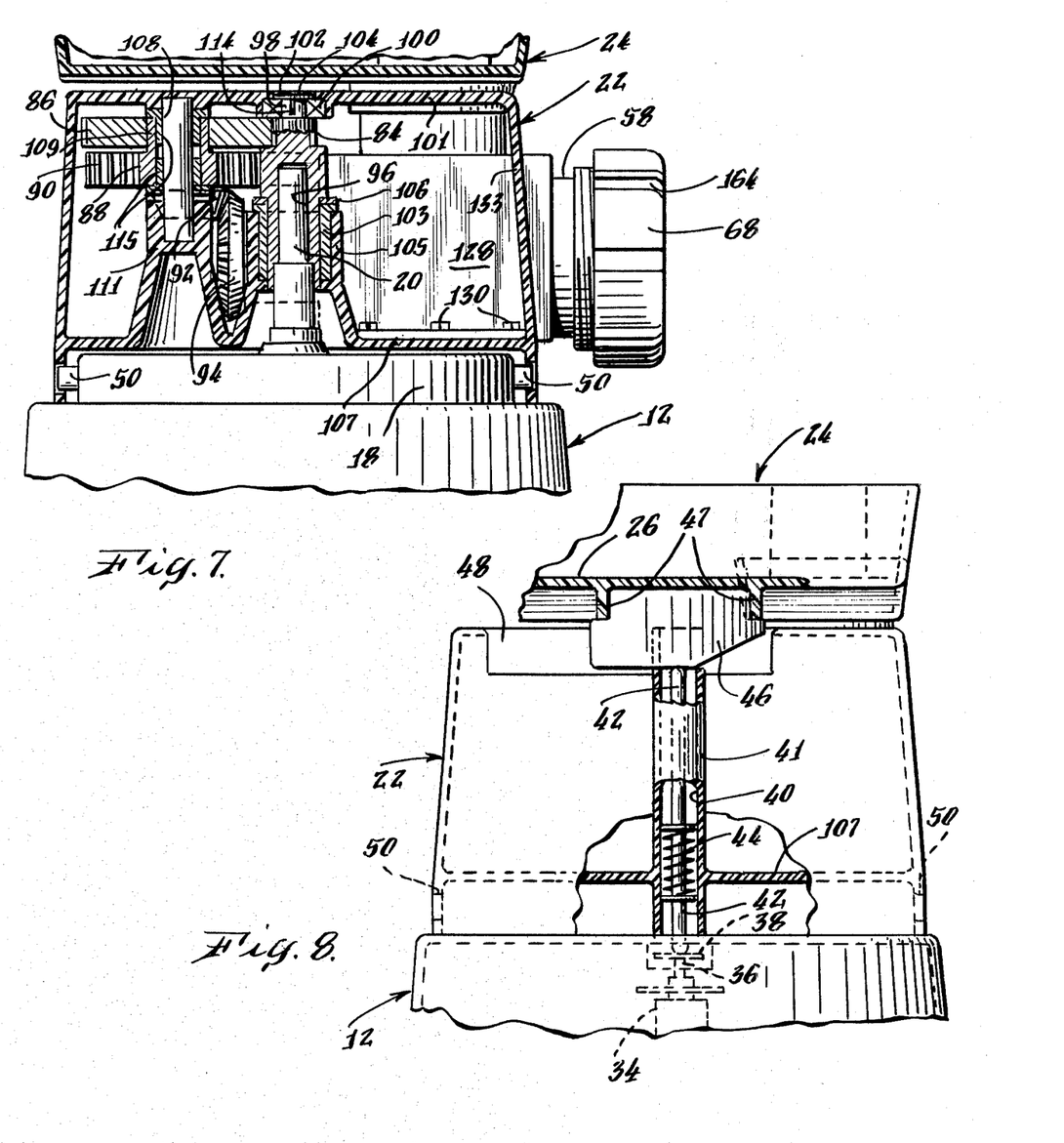
FIG. 7 is a cross-sectional view taken along line 7—7 of FIG. 4 looking toward the right in FIG. 4, that is, toward the front of the machine.
FIG. 8 is a cross-sectional view taken along line 8—8 of FIG. 3.

As will best be seen in FIGS. 3 and 8, the base 12 of the food processor includes first motor drive actuator means in the form of a switch 34 which is operated by a pushbutton 36. The pushbutton 36 is covered by a suitable flexible diaphragm 38 for preventing entry of foodstuffs or other undesirable materials into the base 12. The housing 22 of the extruder apparatus 10 includes second motor drive actuator means, generally indicated at 39, adapted to cooperate with the first actuator means 34, 36. This second actuator means 39 is a movable spring-loaded push-rod 42 located in a vertical passageway 40 in a hollow boss 41 on the rear wall of the housing 22. This push-rod 42 is normally biased upwardly out of contact with the motor switch button 36 by a spring 44. When the housing 22 is mounted in operative position on the base 12, this push-rod 42 is out of contact with, but in alignment with, the push-button 36 of the motor switch 34.

The under side of the tray 24 carries third actuator means in the form of an arcuate-shaped cam 46 (FIGS. 2 and 3) extending downwardly from the tray, secured by brackets 47 to the bottom 26. This cam 46 is adapted to enter into an arcuate channel 48 located in the top of the housing 22. When the cam 46 is moved into the slot 48, by properly orienting the tray 24 on the housing 22, as will be explained later, the cam 46 contacts the push-rod 42 for depressing this push-rod, thereby activating the pushbutton 36 for closing the contacts in the switch 34 for enabling the operation of the motor drive in the base 12 under the control of the levers 14 and 16 (FIG. 1). Accordingly, before the pasta extruder apparatus 10 can be used, both the housing 22 and the tray 24 must be properly positioned on the base 12 of the food processor such that the cam 46, the push-rod 42, and the switch button 36 are all in alignment for closing the switch 34.

As is illustrated in FIGS. 7 and 8, a pair of lugs or lateral tenons 50 projecting outwardly from opposite sides of the circular pedestal 18 on the base 12 are engageable into a pair of elongated slots 52 in the skirt 54 of the housing 22 for detachably mounting the housing 22 on the base 12. In other words, the circular pedestal 18 carries a pair of lateral tenons or lugs 50 on the outer peripheral surface thereof which cooperate with and become engaged in the respective slots 52 when the skirt 54 of the housing 22 is seated on the base 12, and the housing 22 is then rotated counterclockwise and locked onto the base 12, which arrangement is advantageously similar to that for attaching the skirt of the bowl of a food processor to its base as described in U.S. Pat. No. 3,892,365.

Therefore, the housing 22 can be quickly and conveniently mounted by the user onto the base 12 of our existing food processor without making any modification to the base. The skirt 54 on the bottom of the housing 22 is seated down around the circular pedestal 18 with the lugs 50 entering the slots 52. Then the housing 22 is turned a small distance to engage these slots upon the lugs. Thus, the housing 22 is firmly mounted and locked onto the base 12 in operating position with the second activator means 42 aligned with the first actuator means 36, 34. The manner in which the tray 24 is mounted onto the housing 22 and is firmly locked into operative position thereon will now be described.

Figure 2:
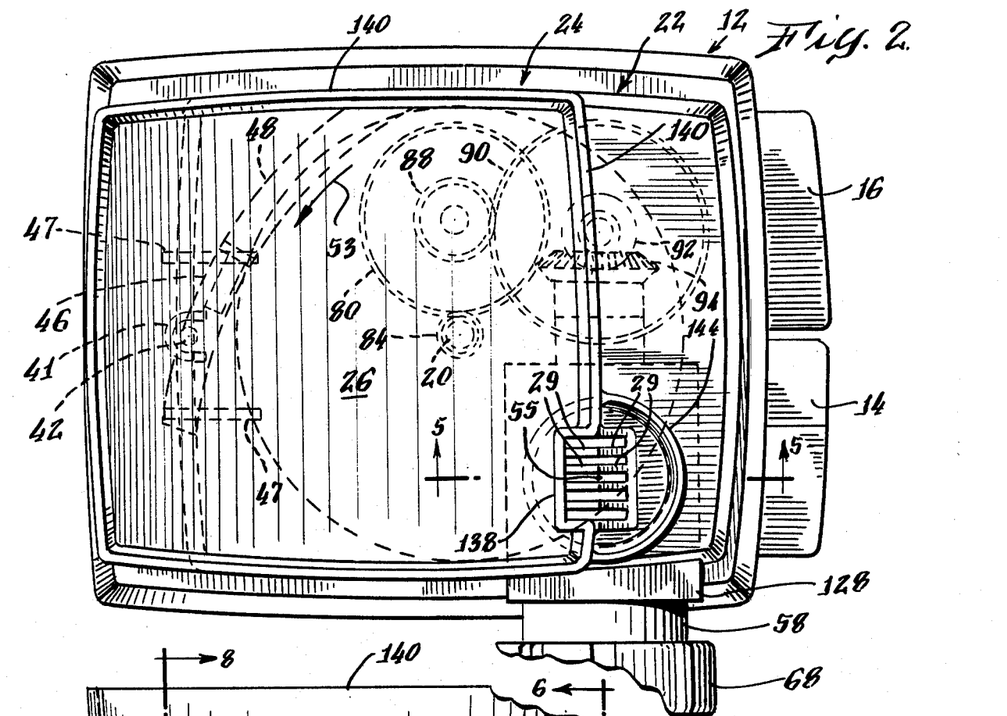
FIG. 2 is a top view of the apparatus shown in FIG. 1.
Figure 6:
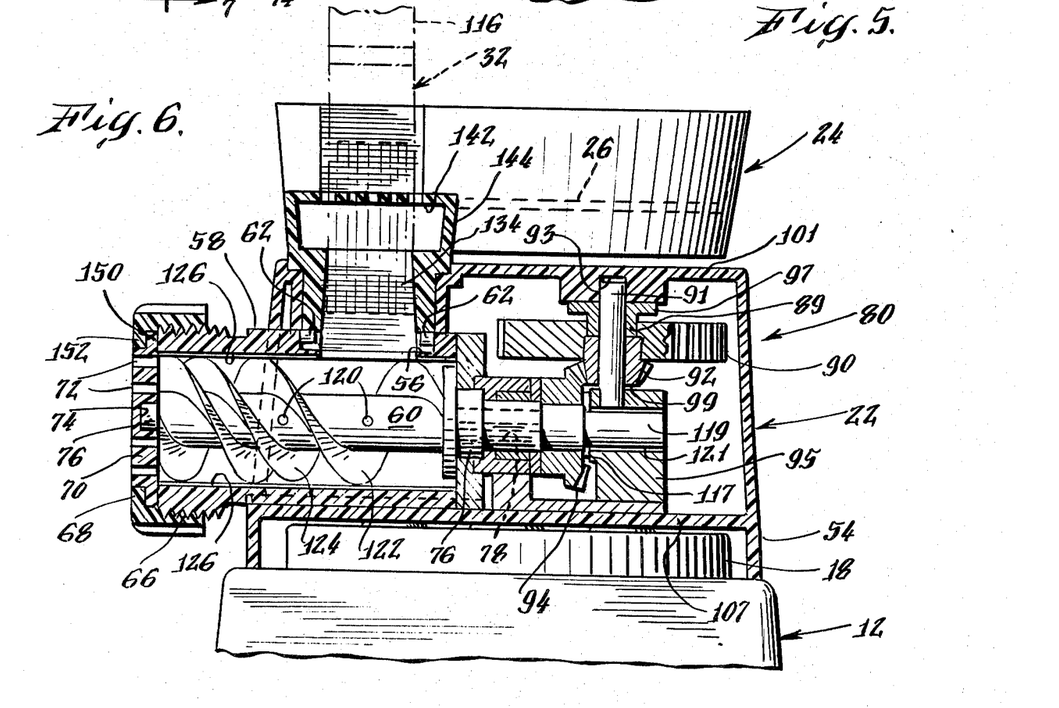
FIG. 6 is a cross-sectional view taken along line 6—6 of FIG. 3 looking to the left in FIG. 3, that is, toward the rear of the machine.

As will best be seen in FIGS. 4, 5 and 6, the feedtube 28 on the tray 24 is insertable down into the socket 30 in the housing 22. This feed tube 28 extends down into a socket opening 56 in the top of a feedscrew barrel 58 which surrounds the feedscrew 60. Anchored in the rim of this socket opening 56 are a pair of bayonet pins 62 which are adapted to fit into and engage in a pair of L-shaped slots 64 on opposite sides of the lower edge of the feed tube 28. Accordingly, when the feed tube extending down from the tray 24 is manually inserted down into the opening 56, the slots 64 on the bottom periphery of the feed tube 28 receive the pins 62. Then the tray 24 is turned counterclockwise into its final position as shown in FIGS. 1 and 2, and these pins 62 lock the tray on the housing by engaging in the slots 64. The tray 24 is released by turning it in the reverse direction relative to the housing 22 in order to free the pins 62 from the L-shaped slots 64. One of these L-shaped slots 64 is most clearly seen in FIG. 4.

After the pins 52 have thus been freed from the slots 64, the tray 24 can now be lifted from the housing 22 by raising the tray vertically upward away from the housing for withdrawing the feedtube 28 up from the socket 30 in the housing.

When the tray 24 is turned relative to the housing 22 for locking the tray onto the housing, the feedtube 28 in socket 30 serves as a hub for turning the tray, while the socket 30 serves as the journal bearing in which the feedtube can be turned. As seen in FIG. 2, the tray 24 is swung in the counterclockwise direction (arrow 53) about the vertical axis 55 of the feedtube 28 for locking the tray in operating position on the housing by engaging the slots 64 (FIGS. 4 and 6) on the pins 62. The tray is swung clockwise about the axis 55 for unlocking the tray. The arcuate channel 48 is curved to be concentric about the feedtube axis 55, and the arcuate cam 46 is curved to conform with this channel. Thus, the cam 46 moves along the channel 48 as the tray 24 is turned (arrow 53) into its locked position, causing the cam to depress the push-rod 42 as described further above.

Inviting attention to the extruder barrel 58 as illustrated most clearly in FIGS. 4 and 6, it is seen that this barrel 58 is generally tubular in configuration, and it is terminated on its front end by screw threads 66. A threaded retainer ring cap 68 secures an extrusion die 70 onto the front end of the barrel 58. This die 70 has a plurality of extrusion orifices 72 therein. The extrusion die has a circular disc-like configuration and also has a socket 74 positioned centrally therein for receiving the front or discharge end of the drive shaft 76 of the feedscrew 60 as a bearing for rotation of the shaft 76 in the socket bearing 74. The rear end of this drive shaft 76 removably fits into a drive socket 78 of a reduction gearing mechanism, referred to generally with the reference character 80, which will be described hereinafter. This drive shaft 76 has a non-circular configuration where it fits into the drive socket 78, for example by a spline 79 of square or hexagonal shape, for providing a positive driving connection between socket 78 and shaft 76. A hexagonal shape is used in this apparatus.

The reduction gearing mechanism 80 includes an input gear 84 (FIGS. 4 and 7) gear 86, gear 88, gear 90 (see also FIG. 6), beveled gear 92, and beveled gear 94 attached to the drive socket 78. As will best be seen in FIGS. 4 and particularly 7, the gear mechanism 80 is extremely compact and efficient. The rotary tool drive shaft 20 of the food processor fits into a driven socket 96 of the reduction gearing mechanism 80. This driven socket 96 includes at its upper end a short stub shaft 98 which is nestled up into a ball bearing unit 100 fastened in the top wall 101 of the housing 22.

On the top end of the stub shaft 98 is mounted an indicator 102 which turns with the shaft and, in effect, permits the alignment of the driven socket 96 with the tool shaft 20 so that the user does not have to turn the housing 22 upside down to try to locate the orientation in which the driven socket 96 fits upon the tool shaft 20. Cooperating in this regard is a thinned down or transparent window 104 in the top wall 101 of the housing 22, permitting the user to see the angular orientation of the indicator 102, so that the entire housing containing the gear mechanism 80 may be properly and readily positioned relative to the tool drive shaft 20 for engaging the driven socket 96 down onto the vertical tool drive shaft 20. This tool drive shaft 20 has a non-circular cross section, for example by having a flat surface on one side or by a spline, keyway, etc., and the driven socket 96 has a mating configuration providing a positive drive relationship from the tool shaft 20 to the socket 96, when this socket is seated down onto the tool shaft 20 as seen in FIG. 7. Since the indicator 102 turns with the stub shaft 98, this indicator always has the same orientation as the interior of the socket 96 and has the same shape as the tool shaft 20. Therefore, when the user positions the indicator 102 in the same angular orientation as the tool shaft, the socket 96 is appropriately aligned for engaging down upon the tool shaft 20. This indicator 102 is a bright-colored plastic element having a tab 114 on the bottom which engages in a transverse slot in the top end of the stub shaft 98.

The lower end of the socket 96 is held in a sleeve bearing 103 (FIG. 7) journaled in a stanchion mount 105 secured to the bottom wall 107 of the housing 22. The sleeve bearing 103 has a flange resting on the rim of the mount 105. There is a thrust washer 106 which holds the socket 96 at the appropriate elevation for the small diameter spur gear 84 secured to the stub shaft 98 to mesh with the large diameter gear 86. Thus, the small gear 84 drives the larger gear 86 which is secured on a rotatable sleeve 109 surrounding the stationary vertical shaft 108. The lower end of this vertical shaft 108 is secured in another stanchion mount 111 on the bottom wall 107, while its to end is received in a recess 113 in the top wall 101. Bearings 115 with thrust washers at the top and bottom of the rotatable sleeve 109 carry this rotatable sleeve on the stationary shaft 108. The smaller spur gear 88 is secured to this same sleeve 109 as the larger gear 86 and therefore is driven for driving the larger meshing gear 90 (see FIG. 4), which is ganged to the beveled gear 92 for driving the beveled gear 94, thereby rotating the socket 78 for rotating the feedscrew 60, thus turning this feedscrew in the barrel 58.

The large gear 90 (FIG. 6) and the beveled gear 92 are both secured to a rotatable sleeve 89 carried on a stationary shaft 91 whose top end is received in a recess 93 in the top wall 101. The lower end of the stationary shaft 91 is mounted in a block 95 anchored on the bottom wall 107 of the housing 22. Thrust bearings 97 and 99 are located on the stationary shaft 91 above and below the rotatable sleeve 89 for holding the beveled gear 92 in meshing engagement with the driven beveled gear 94. In order to bear the rearward thrust of the feedscrew shaft 76 against its drive socket 78, there is a thrust washer 117 interposed between the beveled gear 94 and the anchor block 95. The drive socket 78 has a stub shaft 119 journaled in a sleeve bearing 121 in the anchor block 95. The mounting arrangement for these gears must be strong and rigid, because there is a great increase in torque as the speed is reduced. The purpose of the reduction gear mechanism 80 is to convert the relatively fast rotary speed of the tool drive shaft 20 of the food processor into a much slower appropriate rotational speed with greatly increased torque for driving the feedscrew 60 for forcing the pasta mixture through the extrusion die 70 to form the desired food articles.

Although it will be understood that the pasta extruder apparatus 10 may be adapted to use the tool drives of various food processors or similar electrical appliances, as an illustrative example, in order to adapt the pasta extruder apparatus 10 for use on a Model DLC-7 food processor of Cuisinarts, Inc. of Greenwich, Connecticut, the gear mechanism 80 has the following design specifications:

Gear 84—8 teeth, 24 drive pitch
Gear 86—68 teeth, 24 drive pitch
Gear 88—17 teeth, 16 drive pitch
Gear 90—49 teeth, 16 drive pitch
Gear 92,—13 teeth spiral bevel, for example, Boston Gear No. SH142-P+
Gear 94—26 teeth spiral bevel, for example, Boston Gear No. SH142-G The term "24 drive pitch" means 24 teeth per inch as measured along a circle having the pitch diameter of the particular involute gear.

The above illustrative example of an advantageous speed-reducing, torque-increasing gear mechanism 80 provides a speed reduction of 49 to 1, namely from approximately 1725-1740 revolutions per minute (RPM), the typical speed of the tool drive shaft 20 of a food processor, to approximately 35 RPM of the feedscrew 60. Other similar gear ratios in the range of 40 to 1 through 65 to 1 can be used. The preferred speed for the feedscrew 60 is in the range from approximately 26 RPM to 38 RPM, and the optimum is around 35 RPM for producing the most effective extrusion with a feedscrew 60 of the configuration as shown.

The feedscrew 60 is approximately 4 inches long, made of tough, durable resin material capable of being washed in boiling water, such as nylon or Delrin, secured for example by transverse pins 120 to the shaft 76. At its upstream end this feedscrew 60 includes a single helical blade or flight 122. At its downstream end there is a second helical blade or flight 124 positioned at an angular displacement of 180° about the axis of the shaft 76 from the first blade. The purpose of this second shorter helical blade 124 is to aid in more uniformly pressurizing and pushing the pasta mixture out through the extrusion orifices 72 in the die 70. Both blades 122 and 124 have the same pitch.

In order to aid in propelling the pasta mixture downstream within the barrel 58, there are four axially extending straight parallel shallow grooves 126 (FIGS. 5 and 6) formed in the cylindrical inner surface of the barrel. This cylindrical inner surface of the barrel 58 has a diameter of 1.75 inches, and the diameter of the helical blades 122, 124 is slightly less for providing clearance for rotation of the feedscrew 60 within the barrel. This barrel 58 is made of tough, durable resin material capable of being washed in boiling water, similar to that used to make the feedscrew 60.

In order to facilitate quick and easy cleaning and washing of the barrel 58 and feedscrew 60, they are both readily removable from the housing 22. For this removal there is a stationary cage 128 (FIG. 5) of square cross section fastened by screws 130 to the bottom wall 107 of housing 22. A pair of parallel rails 132 (FIG. 4) extend along opposite sides of this cage 128. The exterior of the upstream end of the barrel 58 is square, as seen in FIG. 4) for fitting snugly into the cage. There are a pair of grooves extending along opposite sides of the barrel for sliding along these rails 132 when the barrel is inserted into its cage 128 in operating position therein.

The pins 62 are anchored in the rim of the socket opening 56 in the top of the barrel 58. Therefore, when the feedtube 28 has been inserted down and locked into this socket opening 56 as shown in FIG. 4, the barrel 58 is thereby locked into the cage 128 and cannot be removed until after the tray 24 has been removed from the housing 22 as described further above. When the barrel 58 has been removed from its cage 128, the feedscrew 60 is easily withdrawn by pulling axially on the downstream ends of the blades 122,124. The rims of these blades are rounded, not sharp. As seen in FIGS. 1 and 2, the mouth of the square cage 128 projects out slightly beyond the side wall 133 of the housing for convenience of the user in removing and reinserting the barrel 58 into its cage.

It is to be noted that the feedtube 28 has a rectangular cross section vertical passageway 134 (FIG. 4). This passageway diverges downwardly as seen in FIGS. 5 and 6 for assuring that the pasta mixture will flow down freely within this passageway, i.e. without tending to "bridge" across it.

The flow path for the pasta mixture from the tray 24 down into the passageway 134 is shown by the arrow 136. This flow path passes beneath the protective grill 29 curving down into the passageway 134. The wall 140 of the tray 24 has an inwardly offset wall portion 138 above the grill 29 for providing an unobstructed view through the grill into the passageway 134 and for providing clearance for insertion of the blades of the plunger 32 as shown in dash and dot outline in FIGS. 5 and 6. The offset wall portion 138 has an opening 142 for defining the entrance to the flow path 136. By virtue of the offset location of this opening 142 and its relatively small size, it is not possible to insert a finger through the opening and down the feedtube into the barrel 58. The tray wall 140 has an attractive flare, and there is a low funnel-shaped semicircular wall 144 around the sloping grill 29 up to the level of the horizontal top part 146 of this sloping grill. The lower part of the sloping grill is attached to the top of the feed tube 28.

FIG. 9 illustrates a plurality of disc-shaped extrusion dies 70 which will have differently shaped extrusion orifices, which are not illustrated in this Figure, in order to extrude different sizes and shapes from the pasta mixture, e.g. spaghetti, linguini, vermicelli, noodles, ribbons, strings, strands, etc. A storage compartment 148 is provided in the housing 22 for accommodating the plurality of extrusion dies 70 which may be selected as desired, placed in the retainer ring cap 68, and mounted on the end of the barrel 58. The rim of each die 70 is rabbeted at 150 for mating with the inner rim 152 (FIG. 6) of the retainer cap 68. The storage compartment 148 is conveniently opened by moving the tray 24 away from its normal operating position as shown in FIGS. 1 and 2.

FIG. 10 illustrates the plunger 32 which has a spatula-type handle 114 which may be used to push remaining quantities of pasta mixture from the tray 24 along the flow path 136 into the feedtube 28. The other end of the plunger 32 has a plurality of blades 154 which conform precisely to the configuration of the barrier grill 29 covering the passageway 134 of the feedtube 28 such that the blades 154 will extend down through the barrier grill 29 for aiding in the feeding process. The lower ends of the blades are curved concave at 155 for clearing the feedscrew.

FIG. 11 illustrates a loosening wrench 156 having a handle 158 and a ring configuration 160 with an internal diameter slightly exceeding the external diameter of the retainer cap or ring nut 68. This circular wrench head 160 has internal lugs 162 which are adapted to fit into the notches 164 (FIG. 1) in the retainer cap 68 such that the head of this wrench can be slid over the retainer cap and used to loosen this cap, when the extrusion dies are to be changed and/or the machine is to be cleaned. This cap 68 is normally installed only "hand tight," but the pressures and torque of the feedscrew generated during extrusion sometimes cause the cap to become tightened on the screw threads 66 so that the wrench 156 may be needed to loosen it.

In using the extruder apparatus 10, the pasta mixture is prepared in a regular bowl, and is preferably in the form of a powder or granular consistency which is slightly dampened, because the pasta mixture works better with less pressure when it is slightly dampened. If the mixture is too wet, doughy or sticky, the extrusions tend to stick or clump together.

The apparatus 10 is assembled by the user by aligning the indicator 102 through the window 104 with the position of the rotary tool shaft 20. The socket 96 in the housing 22 is then seated on the tool shaft, and the housing is turned counterclockwise relative to the base 12 so that the projections 52 on the base 12 engage in the elongated slots 50 in the skirt 54 of the housing 22, thereby locking the housing 22 in operating position on the base 12. The tray 24 is then assembled to the housing 10 by placing the feedtube 28 down into the housing socket 30 such that the bayonet pins 62 in the barrel 58 enter the slots 64 in the bottom of the feedtube 28. The tray 24 is then turned counterclockwise (arrow 53, FIG. 2), locking the bayonet pins 62 in the slot 64, and also moving the cam 46 on the bottom of the tray through the slot 48 in the housing, so that the cam 46 engages and depresses the push-rod 42, thereby activating the motor button 36 of the motor drive switch 34 for enabling the motor to be turned on and off by the controls 14, 16. The pasta mixture, which has previously been prepared, is then placed in the tray, where it is fed at 136 down through the feedtube passageway 134, into the barrel 58, and onto the feedscrew 60. This feedscrew is rotated by being driven from the tool shaft 20 through the gear mechanism 80 to force the pasta mixture out of the barrel 58 through the extrusion orifices 72 of the die 70. The barrel is locked in position in its cage 128 as described further above when the tray 24 is installed in operating position on the housing 22.

The apparatus 10 is disassembled by rotating the tray in the clockwise direction, whereby the cam 46 disengages from the push-rod 42, and the pins 62 in the barrel opening become freed from the horizontal arcuate portions of the L-shaped retaining slots 64 in the lower end of the feedtube 48. The tray is then removed from the housing 22 by lifting it upwardly. The extrusion components can then be cleaned by loosening the retainer cap 68 and removing it from the threaded end of the barrel 58. The feedscrew 60 can be removed along with the barrel 58, cleaned, and then reassembled.

Pasta extruder apparatus is thus provided which is compact, easy to assemble and disassemble, and to clean, and provides a wide choice of extrusion dies. Although the attachment apparatus utilizes the very powerful motor drive of a food processor or similar appliance, the built-in safety features which have been incorporated in a number of the food processors are preserved by requiring proper alignment and positioning of the housing as well as the tray on the base before the motor drive can be operated for driving the pasta extruder. The feedtube attached to the tray for feeding the pasta mixture into the extruder apparatus allows the user to view the feeding and extruding operation while the grill prevents the inadvertent insertion of fingers into the feedscrew apparatus. The housing of the pasta extruder 10 includes a compartment for storing the dies so that a variety of food articles may be extruded. The pasta extruder apparatus facilitates assembly and disassembly for both operation and cleaning.

Since other changes and modifications varied to fit particular operating requirements and environments will be understood by those skilled in the art, the invention is not considered limited to the examples chosen for purposes of illustration, and includes all changes and modifications which do not constitute a departure from the true spirit and scope of this invention as defined in the following claims and reasonable equivalents of the claimed elements.

What is claimed is:

1. Pasta extruder apparatus adapted to be mounted as an attachment to the base of a food processor containing a motor drive and a vertical tool shaft rotated by the motor drive, said base having first actuator means for preventing operation of the motor drive unless said first actuator means is actuated, said pasta extruder apparatus comprising:

a housing containing an extruder feedscrew mounted in a barrel for rotation about the axis of the feedscrew for forcing pasta mixture downstream in the barrel toward the downstream end of the barrel with extrusion die means mountable on the downstream end of the barrel through which the pasta mixture is extruded for forming the desired articles of food, said housing being mountable in operating position upon the base of a food processor, said housing containing a speed-reducing torque-increasing gear mechanism, a coupling connected to the input gear of said gear mechanism with the output of said gear mechanism being coupled to said feedscrew for turning said feedscrew in said barrel, said coupling being engaged in driven relationship with the tool drive shaft when the housing is mounted on said base for causing the rotation of said tool drive shaft to drive said coupling for transmitting greatly increased torque through said gear mechanism to said feedscrew for turning said feedscrew, said housing containing second actuator means which becomes aligned with said first actuator means when the housing is properly mounted on the base, said housing having a socket communicating with the upstream end of said barrel, said socket having an upright axis, a tray removably mountable on said housing, said tray being adapted to hold a pasta mixture in feedable relationship with a feedtube insertable down into said socket with the axis of said feedtube being aligned with the axis of said socket for allowing said tray to be rotated relative to the housing about the axis of said socket, said socket having fastening means engageable with said feedtube in locking relationship for locking the tray onto the housing when said tray is turned into a predetermined position about said axis of said socket, and said tray having third actuator means thereon engageable with said second actuator means for causing said second actuator means to actuate said first actuator means for enabling the motor drive to operate only after said housing has been properly mounted on said base and said feedtube has been inserted into said socket and said tray turned into said predetermined position.

2. Pasta extruder apparatus as claimed in claim 1, in which:

said coupling can be engaged with said tool drive shaft only after said coupling has been aligned with the tool drive shaft in mating relationship therewith, and a rotatable indicator in said housing connected to said coupling for rotating with said coupling, said indicator indicating the angular position of said coupling relative to the housing, and said housing having a viewing port for enabling the user to see the indicator for facilitating the alignment of the coupling with the tool drive shaft in proper mating relationship as the housing is being mounted on the base.

3. Pasta extruder apparatus as claimed in claim 1 or 2, in which:

a grill having multiple small openings covers the top end of said feedtube for barring the entry of foreign objects into said feedtube, said tray has a lateral opening leading into said feedtube below said grill, and said opening is offset from the feedtube and is too small to enable a finger to extend through said opening sufficiently far down the feedtube to reach the barrel containing the feedscrew.

4. Pasta extruder apparatus as claimed in claim 1 or 2, in which:

said extrusion die means is removable from the downstream end of said barrel for interchanging with other extrusion die means having different die configurations, said housing having a compartment in the top for holding a plurality of said interchangeable die means, and said tray covering said compartment for holding said interchangeable die means in said compartment when said tray is turned into said predetermined position about the axis of said feedtube.

5. Pasta extruder apparatus as claimed in claim 1 or 2, in which:

said housing has an arcuate channel in the top thereof concentric about the axis of said feedtube socket, and said third actuator means is a cam extending down from the bottom of said tray at a predetermined radial distance from the axis of the feedtube on the tray at the same distance as said arcuate channel from the axis of said socket for causing said cam to swing along said channel as the tray is turned with said feedtube inserted into said socket.

6. Pasta extruder apparatus for extruding articles of food from a pasta mixture adapted to be mounted on an appliance having a rotary drive for being driven by the motor drive of said appliance as an attachment thereto, comprising:

a housing having an opening therein for receiving a pasta mixture which is to be extruded by said apparatus, a removable inclined tray positioned on said housing and having a feedtube extending downwardly therefrom which fits into said opening in said housing for feeding a pasta mixture into said housing when said tray is mounted thereon, a barrel in said housing in communication with said opening carrying a feed screw, an extrusion die mounted on the discharge end of said barrel having a plurality of extrusion orifices whereby said feed screw applies said pasta mixture under pressure to said extrusion die, and drive means coupled to said feedscrew at the other end of said barrel for rotating said feedscrew thereby driving said pasta mixture through said extrusion die under pressure for forming articles of food from said pasta mixture.

7. The extruder apparatus claimed in claim 6 in which:

said feedtube has slots in the lower end thereof and there are pin means in said barrel which register in said feedtube slots when said feedtube is inserted in the opening in said housing for retaining said feedtube in said barrel.

8. The extruder apparatus claimed in claims 6 or 7 in which:

said housing carries a motor actuator rod and has an arcuate slot leading to the top of said actuator rod, a cam mounted on the bottom of said tray adapted to be rotated in said arcuate slot for contacting and depressing said rod when said tray is properly positioned on said housing by rotating the tray after said feedtube has been inserted into said opening.

9. The extruder apparatus set forth in claim 7 having a barrier grill extending over said feedtube for allowing the user to look into said feedtube while preventing the insertion of fingers therein.

10. The extruder apparatus set forth in claim 6 in which:
said housing has a skirt and locking means thereon which is adapted to engage the appliance on which said housing is positioned.

11. The extruder apparatus set forth in claim 6 in which:
said housing includes an extrusion die compartment for storing a plurality of interchangeable extrusion dies.

12. The extruder apparatus set forth in claim 9 including:
a plunger having multiple blades on one end thereof and a spatula handle,
said blades having a configuration complementary with said barrier grill such that said blades may be plunged through said barrier grill into said feedtube for pushing pasta mixture down within said feedtube.

13. The extruder apparatus set forth in claims 6, 7, 9, 10, 11 or 12 wherein:
said drive means comprises a reduction gearing mechanism adapted to be coupled to the motor drive of said appliance on which said extruder apparatus is employed as an attachment, said reduction gearing mechanism comprising a first gear adapted to be driven by said motor drive, second and third ganged gears driven by said third gear, said fifth gear being a beveled gear, and a sixth gear which is beveled driven by said fifth gear, said sixth gear being coupled to said feedscrew for driving said feedscrew at a greatly reduced speed and greatly increased torque relative to said appliance.

14. The extruder apparatus as claimed in claim 6 in which:
said discharge end of said barrel carrying said extrusion die is threaded and said extrusion die is mounted on said threaded end by a notched, threaded cap which is adapted to be loosened with a loosening wrench having teeth which fit into said notches.

15. Pasta extruder apparatus for operation as an attachment for a food processor of the type having a base with a motor housed therein, a motor-driven rotary drive means extending therefrom and a motor-drive actuator means adapted to be actuated on the mounting of a working bowl and cover which employs the motor drive in said base, said pasta extruder attachment comprising:
a housing having a feed opening therein for receiving a pasta mixture which is to be extruded by said apparatus, said housing being adapted to be operatively positioned on said base,
actuator-rod means carried by said housing which is positioned in alignment with said motor-drive actuator means in said base when said housing is operatively positioned on said base,
a barrel positioned in said housing carrying a feedscrew and having an opening therein in alignment with said feed opening in said housing for receiving said pasta mixture,
an extrusion die having a plurality of extrusion orifices mounted on the discharge end of said barrel,
drive means coupling said feedscrew at the other end of said barrel to said motor-driven rotary drive means extending from said base,
a removable tray mountable on said housing for feeding a pasta mixture into said feed opening, and
a cam actuator on said tray for actuating said actuator rod means when said housing is operatively positioned on said base and said tray is properly mounted on said housing for depressing said actuator rod means for enabling said motor drive in the food processor base to be used to drive said feedscrew for extruding said pasta mixture through said extrusion die into the desired articles of food.

16. The pasta extruder apparatus claimed in claim 15 in which:
said housing has an indicator viewable by the user from the top of said housing for aligning said housing with said motor-driven rotary drive means of said food processor for aiding in mounting said apparatus as an attachment on said base.

17. The pasta extruder apparatus as claimed in claim 15 in which:
said removable tray has an inclined bottom slanting downwardly to a feedtube which extends downwardly therefrom, and
said feedtube extends down through said feed opening in said housing and into said opening in said barrel when said tray is positioned on said housing.

18. The pasta extruder apparatus as claimed in claim 17 in which:
said feedtube has a cylindrical shape and contains arcuate slots in the lower portion thereof, pin means are anchored in said barrel adapted to be captured by said slots in said feedtube when said feedtube is inserted into said barrel and rotated therein for retaining said feedtube in said barrel until released therefrom by a reverse twist of said tray.

19. The pasta extruder apparatus as claimed in claim 15, 16, 17 or 18 in which:
the top of said housing has an arcuate channel leading over the top of said actuator rod means for guiding said cam actuator onto said actuator rod means when said tray is positioned on said housing.

20. The pasta extruder apparatus as claimed in claim 17 having a barrier grill extending over an area of the feedtube extending downwardly into said barrel for allowing the user to view internally into the feedtube and barrel while guarding the barrel from the inadvertent insertion of fingers of the user therein.

21. The pasta extruder apparatus set forth in claim 15 having an extrusion die compartment in said housing for storing a plurality of interchangeable extrusion dies.

22. The pasta extruder apparatus set forth in claims 15, 16, 17, 18, 20 or 21 in which:
said drive means for said feedscrew comprises a plurality of meshing gears driven by said motor-driven rotary drive means which reduces the speed of said motor-driven rotary drive means by a factor in the range of 40 to 65 times.

23. The pasta extruder apparatus as claimed in claim 22 in which:
said speed reduction is by a factor of approximately 49.

* * * * *